UNITED STATES PATENT OFFICE.

FRITZ HOFMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANHYDRID OF ACYL SALICYLIC ACID.

No. 922,766.  Specification of Letters Patent.  Patented May 25, 1909.

Application filed October 31, 1907. Serial No. 399,991.

*To all whom it may concern:*

Be it known that I, FRITZ HOFMANN, doctor of philosophy, chemist, citizen of the German Empire, residing at Elberfeld, Germany, Kingdom of Prussia, have invented new and useful Improvements in Anhydrids of Acyl Salicylic Acids, of which the following is a specification.

This invention relates to the manufacture and production of the hitherto unknown anhydrids of acyl-salicylic acids having most probably the following general formula:

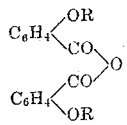

(R meaning an acyl radical).

These new products are valuable therapeutic compounds. They are tasteless and non-irritant and surpass in this respect even the acetyl salicylic acid frequently administered as a substitute for salicylic acid. Acetyl salicylic acid has a marked acid taste which is disagreeable to many patients and furthermore it may produce unpleasant results in case of abnormal sensitiveness of the mucous membranes of the stomach. The new compounds do not suffer from these disadvantages and have proved to be valuable remedies for influenza, rheumatic or other diseases in which salicylic acid is administered. They are to be prescribed or taken in similar doses as sodium salicylate or acetyl salicylic acid.

The process for producing the new compounds consists in treating acyl-salicylic acids with phosgen in the presence of tertiary bases; *e. g* pyridin.

The new products are white neutral compounds which do not give with ferric chlorid the violet coloration characteristic of salicylic acid. They are soluble in hot alcohol and scarcely soluble in water. On boiling the anhydrids for some time with caustic alkalies they are decomposed salicylic acid being formed.

In order to illustrate my invention I give the following example, the parts being by weight: 158 parts of pyridin are added to a solution of 360 parts of acetyl salicylic acid in 500 parts of benzene, and a solution of 99 parts of phosgen in 500 parts of benzene is then added to this mixture while it is cooled and stirred. The reaction begins at once, carbonic acid being evolved and pyridin hydrochlorid being precipitated. When the reaction is complete ice and dilute hydrochloric acid are added and the mixture is well agitated in a separating funnel. The aqueous layer containing the pyridin hydrochlorid is separated from the benzene solution and the latter is dried over granular chlorid of calcium; the benzene is then distilled off *in vacuo* on the water bath and the residue is extracted with 500 parts of warm ether (free from alcohol and water). On cooling the new anhydrid of acetyl salicylic acid having probably the formula:

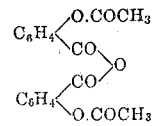

crystallizes from the ether. It is filtered off and dried at from 50 to 60° C. Its formation takes probably place according to the following formula:

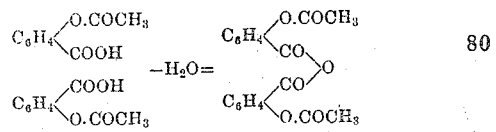

The new compound forms white crystals melting at 82 to 83° C. and after repeated crystallization from alcohol at 85° C. It is tasteless and of neutral reaction, soluble with difficulty in ether and scarcely soluble in water, soluble in hot alcohol and easily soluble in acetone. On boiling it with an excess of caustic soda lye it is decomposed, salicylic acid being formed.

The other anhydrids of acyl salicylic acids are produced in an analogous manner.

The anhydrid of carboxethyl salicylic acid

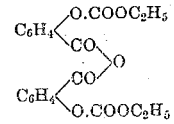

melts at 64° C.

The anhydrid of benzoylsalicylic acid

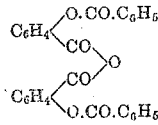

melts at 106–107° C.

The anhydrid of cinnamyl salicylic acid

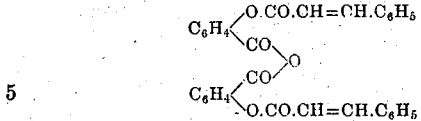

melts at 114–116° C.

Having now described my invention and in what manner the same is to be performed, what I claim as new and desire to secure by Letters Patent is:—

1. The herein-described new anhydrids of acyl salicylic acids obtainable by the action of phosgen and pyridin upon acyl salicylic acids which are white crystalline neutral compounds soluble in hot alcohol, scarcely soluble in water and do not give the violet coloration with ferric chlorid; which by heating with caustic alkalies are decomposed salicylic acid being formed; and exhibiting valuable therapeutic properties, substantially as hereinbefore described.

2. The herein-described new anhydrid of acetyl salicylic acid having probably the above formula, obtainable by the action of phosgen and pyridin upon acetyl salicylic acid, and being a white crystalline neutral compound melting at 85° C. after recrystallization from alcohol, being easily soluble in acetone, soluble in hot alcohol, soluble with difficulty in ether and being scarcely soluble in water and not giving the violet coloration with ferric chlorid, salicylic acid being regenerated by heating it with caustic soda lye; and exhibiting valuable therapeutic properties, substantially as hereinbefore described.

In testimony whereof I have hereunto set my hand in the presence of two subscribing witnesses.

FRITZ HOFMANN. [L. S.]

Witnesses:
 OTTO KÖNIG,
 WM. WASHINGTON BRUNSWICK.